Nov. 21, 1950 H. T. WINCHEL 2,530,748

RADIO REPEATING SYSTEM

Filed Aug. 17, 1945 2 Sheets-Sheet 1

INVENTOR.
HENRY T. WINCHEL
BY E. W. Woodbury
ATTORNEY

Nov. 21, 1950 H. T. WINCHEL 2,530,748

RADIO REPEATING SYSTEM

Filed Aug. 17, 1945 2 Sheets-Sheet 2

INVENTOR.
HENRY T. WINCHEL

BY E. W. Woodbury

ATTORNEY

Patented Nov. 21, 1950 2,530,748

UNITED STATES PATENT OFFICE 2,530,748

RADIO REPEATING SYSTEM

Henry T. Winchel, Roscoe, Calif., assignor to Bendix Aviation Corporation, South Bend, Ind., a corporation of Delaware Application August 17, 1945, Serial No. 611,010

8 Claims. (Cl. 250—15)

This invention relates to radio communication systems of such extent, relative to the range and character of the wave energy employed, that repeater stations are necessary, and it is particularly useful in systems for radio communication between vehicles operating over areas of considerable extent.

An object of the invention is to provide a radio repeating system that is simple and practicable, for extending the range of low power high frequency signals.

Another object is to provide a radio repeating system that will enable two-way communication over an area of indefinite extent with the use of carrier waves of only two frequencies.

Another object is to provide a system that adapts high frequency radio waves having straight line propagation characteristics for practical use in communication between vehicles and the like.

Other more specific objects and features will become apparent from the description to follow, of a system in accordance with the invention.

As adapted for two-way communication between vehicles traversing an area, or between vehicles and fixed stations, the present invention employs a plurality of repeating stations distributed across the area at intervals somewhat less than the positive range of the signals transmitted, which repeaters function to pick up signals from any part of the area and repeat them over the entire area. The communicating stations (hereinafter referred to as sub-stations), which may be located either on vehicles traveling over the area or at fixed locations within the area, are capable of receiving signals on either or both of two frequencies $f1$ and $f2$, but need transmit on only one frequency, $f2$. The repeating stations all have substantially the same equipment and function to repeat the signals on the other frequency than that on which the signals are received. Thus, signals transmitted from a sub-station on frequency $f2$ are received by the nearest repeating station and retransmitted on frequency $f1$, which may be received directly by another sub-station, and is also received by one or both of the next adjacent repeating stations, which in turn retransmit the signals on frequency $f2$. The repeating continues from one repeating station to the next with a shift in frequency at each repeating station, to the end of the system.

A system, as so far described, would be subject to undesired oscillation because of "singing" circuits set up between the different repeating stations, if provision were not made to prevent it.

In accordance with the present invention "singing" circuits are prevented by employing directional reception and transmission in part at the repeating stations. Thus, each repeating station includes the equivalent of three separate repeating units so interlocked that when any one of them is functioning, the other two are locked out. One of the units receives directionally from one direction on frequency $f1$ and transmits directionally in another direction on frequency $f2$. The second unit receives directionally on frequency $f1$ from the said other direction and transmits directionally on frequency $f2$, in the said one direction. The third unit receives non-directionally on frequency $f2$ and transmits non-directionally on frequency $f1$.

When a sub-station transmits, on frequency $f2$, its signals are received non-directionally at the nearest repeating station and retransmitted non-directionally on frequency $f1$. However, the signals retransmitted on frequency $f1$ are received by the next adjacent repeating stations directionally and are retransmitted on frequency $f2$, in direction away from the first mentioned repeating station, so that they cannot be received at the first mentioned repeating station with sufficient intensity to set up a "singing" circuit, or loop, between two repeating stations.

The operation as described is repeated throughout the system, one set of alternate repeating stations retransmitting the signal non-directionally on frequency $f1$ and the other set of alternate repeating stations retransmitting the signals directionally on frequency $f2$.

Referring now to the drawing.

*General description of system*

Figure 1:
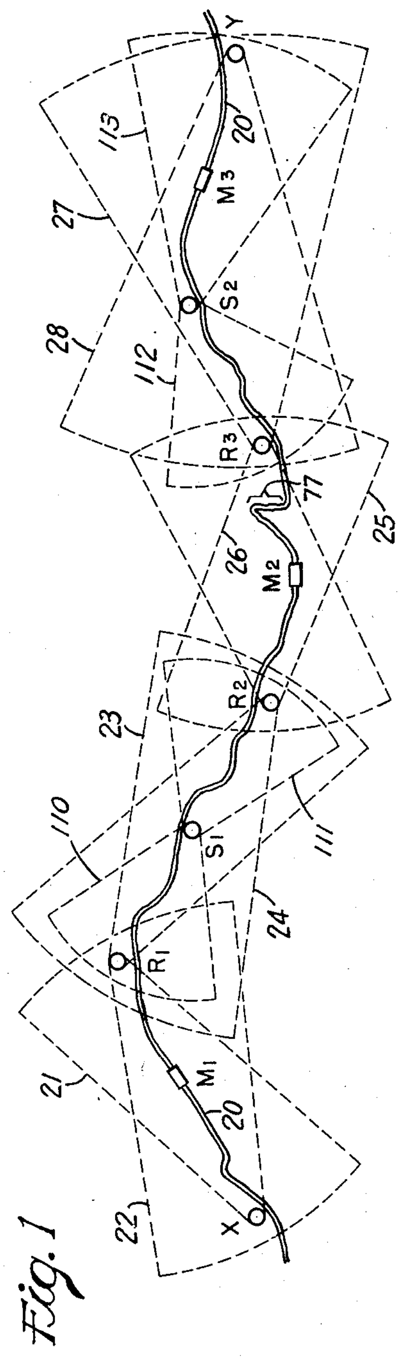
Fig. 1 is a plan view, or map, showing typical locations of signaling stations and of repeating stations in a system in accordance with the invention.

Referring first to Fig. 1, there is shown a system in accordance with the invention for providing communication between a plurality of substations located at intervals along a highway 20, some of the sub-stations consisting of mobile units mounted on vehicles adapted to operate over the road 20, and other sub-stations being located at fixed points along the road.

Thus, there are shown two terminal sub-stations X and Y located at opposite ends of the road 20, which may be of any length. There are also shown two intermediate stationary substations S1 and S2, which are positioned adjacent the road but at spaced intervals therealong, intermediate the terminal stations X and Y. There are also shown three mobile sub-stations M1, M2, and M3, which may be on busses, trucks, police cars, or other vehicles operating on the road 20.

It is contemplated that the system of Fig. 1 will employ radio waves of relatively high frequencies capable of being propagated only along a line of sight (disregarding reflections) and of such power as to have a range much less than the total length of the road 20, so that the signals will have to be repeated at intervals along the route in order to effect proper coverage. To this end, repeater stations are provided at fixed points along the route, three such repeater stations identified as R1, R2, and R3 being shown in Fig. 1.

As previously pointed out, the present invention provides thorough coverage of the entire route while employing only two frequencies, and without the necessity of manual switching for the selection of frequencies. This result is obtained by making the receivers at all the substations responsive to both frequencies at all times, and by changing the frequency at each repeater station, and using directional transmission and reception at some of the repeater stations.

It is preferable, although not essential, to utilize either uni-directional or bi-directional transmission and reception at the fixed sub-stations, while using non-directional transmitting and receiving equipment at the mobile sub-stations.

In Fig. 1, the field patterns of transmission and reception at each fixed station are roughly indicated by sectors. Thus, the fixed sub-station X receives and transmits with maximum efficiency within the sector 21. The repeater station R1 receives and transmits with maximum efficiency in the two sectors 22 and 23, respectively; the repeating station R2 receives and transmits with maximum efficiency in the two sectors 24 and 25, respectively; and the receiving station R3 transmits and receives with maximum efficiency in the two sectors 26 and 27, respectively. The terminal sub-station Y receives and transmits with maximum efficiency within the sector 28.

Figure 2:
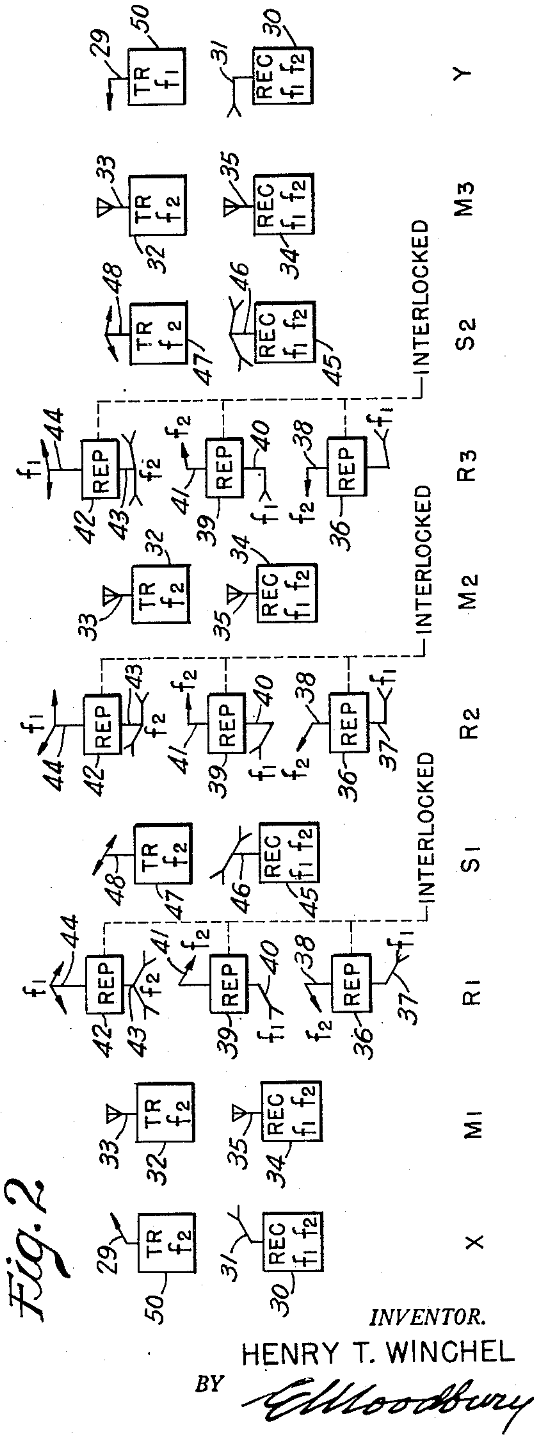
Fig. 2 is a schematic diagram showing the essential equipment elements at each of the stations in the system of Fig. 1.

The equipment at the different stations is shown schematically in Fig. 2. Thus, the equipment at the terminal sub-station X comprises a transmitter 59 having a directive antenna 29 indicated as an arrow pointed in the direction to effect coverage within the sector 21 of Fig. 1, and a receiver 30 having a directive antenna 31 indicated as an arrow so pointed as to receive with maximum efficiency signals transmitted at points within the sector 21. The transmitter 59 transmits on one frequency identified as $f2$, and the receiver 30 is adapted to receive signals on both the frequency $f2$ and a different frequency $f1$. Two forms of receiver capable of simultaneously receiving signals on two properly chosen frequencies will be described later with reference to Figs. 7 and 8.

The mobile sub-station M1 is shown provided with a transmitter 32 adapted to transmit signals on the frequency $f2$ over a non-directional transmitting antenna 33, and a receiver 34 having a non-directional receiving antenna 35 and adapted to receive signals on both frequencies $f1$ and $f2$.

The apparatus at all the repeating stations, R1, R2, and R3, is identical except with respect to the orientation of the antennas. Thus, the apparatus at repeating station R1 comprises a repeater 36 having a uni-directional receiving antenna 37 adapted to receive signals entering from sector 23 at frequency $f1$, and a uni-directional transmitting antenna 38 over which the same signals are repeated on frequency $f2$ in to sector 22. It includes a second repeater 39 having a uni-directional receiving antenna 40 adapted to receive signals on frequency $f1$ from sector 22, and having a uni-directional transmitting antenna 41 from which the same signals are retransmitted on frequency $f2$ into sector 23. Repeating station R1 includes a third repeater 42 having a bi-directional antenna 43 adapted to receive signals on frequency $f2$ from either sector 22 or sector 23 and retransmit the received signals from a bi-directional transmitting antenna 44 on frequency $f1$ into both sectors 22 and 23.

As indicated diagrammatically in Fig. 2, the three repeaters 36, 39 and 42 at each repeating station are interlocked. The interlock will be more fully explained later with respect to Fig. 3, and it will suffice to state at this point that the interlock functions to disable any two of the repeaters while the third repeater is in operation. In other words, during reception of a signal at frequency $f1$ by the repeater 36 over its receiving antenna 37, the repeaters 39 and 42 are disabled; while the repeater 39 is repeating signals rceived at frequency $f1$ over its receiving antenna 40, the repeaters 36 and 42 are disabled; and while the repeater 42 is repeating signals received on frequency $f2$ over its receiving antenna 43, the repeaters 36 and 39 are disabled. This interlock is an important feature of the invention and is essential to the proper operation of the system.

The apparatus at the stationary sub-station S1 includes a receiver 45 having a bi-directional receiving antenna adapted to receive signals on both frequencies $f1$ and $f2$ from both directions along the route within sectors 110 and 111. It also includes a transmitter 47 having a bi-directional transmitting antenna 48 from which signals may be transmitted on frequency $f2$ in either direction along the route.

The apparatus at the repeating station R2 is identical with that at the repeating station R1 except for the orientation of the antennas, and corresponding parts bear the same reference numerals. It will be observed that at station R2 the repeater 36 receives on frequency $f1$ from sector 25 and retransmits on frequency $f2$ to sector 24; repeater 39 receives signals on frequency $f1$ from sector 24 and retransmits on frequency f2 to sector 25; and the repeater 42 receives signals on frequency f2 from both sectors 24 and 25 and retransmits the signals at the frequency f1 into the same sectors 24 and 25.

The apparatus at the mobile sub-station M2 is identical with that at the mobile sub-station M1, and corresponding parts bear the same reference numerals.

The apparatus at repeating station R3 is identical with that at repeating stations R1 and R2 except for the orientation of the antennas, and corresponding parts bear the same reference numerals. It will be observed that the repeater 36 receives signals on frequency f1 from sector 27 and retransmits them on frequency f2 to sector 26; repeater 39 receives signals on frequency f1 from sector 26 and retransmits them on frequency f2 to sector 27; and the repeater 42 receives signals on frequency f2 from either sector 26 or sector 27 and retransmits the signals on frequency f1 into both those sectors, 26 and 27.

The apparatus at the stationary sub-station S2 is identical with that at the sub-station S1 except for the orientation of the directive antennas, and corresponding parts bear the same reference numerals. It receives and transmits within the sectors 112 and 113.

Likewise, the apparatus at the mobile sub-station M3 is identical with the mobile stations M1 and M2, and corresponding parts bear the same reference numerals.

The apparatus at the terminal sub-station Y is identical with that at the terminal sub-station X except for the orientation of the directional antennas, and corresponding parts bear the same reference numerals. It will be observed that the receiver 30 is adapted to receive signals on both frequencies f1 and f2 in sector 28, and the transmitter 50 is adapted to transmit signals on frequency f1 to sector 28.

The antennas 29 and 31 at the terminal stations X and Y are shown as uni-directional, and the antennas 43 and 44 at the repeating stations R1, R2, and R3, and the antennas 46 and 48 at the stationary sub-stations S1 and S2 have been shown as bi-directional. However, it is not essential to the proper operation of the system that these antennas 29, 31, 43, 44, 46, and 48 be directional, and they can be non-directional. The only advantage of making them directional, as shown, is to improve the efficiency of transmission and reception in the useful directions. Whether or not they transmit and receive efficiently in other directions is immaterial.

However, it is essential to the proper operation of the system that the antennas 37, 38, 40 and 41 at each repeating station be uni-directional, in order to prevent setting up "singing" circuits in the system. The reason for this will become apparent from the description of operation of the system to follow.

*Operation when transmitting from sub-station X*

The system described functions to blanket the entire route with signals originating at any one of the sub-stations. In some regions, the signal will be of useful intensity only at the frequency f1, and in other regions only at the frequency f2. However, by virtue of the fact that the receivers at all the sub-stations are adapted to respond to signals of both frequencies, every station will hear a signal transmitted from any other station.

Assume that a signal is transmitted on frequency f2 from the terminal sub-station X. The signal is transmitted on frequency f2 throughout sector 21 and will be received by the mobile sub-station M1, and by the repeating station R1. At the repeating station R1, the signal is received on the bi-directional antenna 43 and is retransmitted over the bi-directional antenna 44 at frequency f1 into sectors 22 and 23. In sector 23, it will be received by the stationary station S1 and the repeating station R2. The stationary station S1 may also be receiving the signal simultaneously on frequency f2 directly from the originating station X, but this is immaterial.

The repeating station R2 receives the signals from repeating station R1 on frequency f1 over its receiving antenna 40 and retransmits the signals on frequency f2 forwardly into sector 24.

The signals transmitted on frequency f2 from repeating station R2 must not be received by the antenna 43 at repeating station R1, else a "singing" circuit would be set up, and it is for this reason that antenna 41 is made uni-directional and directed toward repeating station R3. Of course, it is impracticable to provide antennas that have perfect directional characteristics, and weak signals from the antenna 41 at repeating station R2 will be received on antenna 43 at repeating station R1, but the magnitude of the energy received at repeating station R1 from antenna 41 at repeating station R2 can be readily kept small enough to prevent a "singing" circuit being set up.

As previously indicated, the repeating station R2 retransmits the signals which originated at station X into the sector 25 at a frequency of f2, which signals will be received by the mobile sub-station M2 and the repeating station R3.

At repeating station R3, the signals will be received on the bi-directional antenna 43 and retransmitted by the bi-directional antenna 44 at frequency f1 both back into sector 26 and forward into the sector 27, where they will be received by the stationary station S2, the mobile sub-station M3, and the terminal sub-station Y. Because of the uni-directional characteristics of the antenna 40 at repeating station R2, the signals transmitted back into sector 26 will not be received at repeating station R2 with sufficient intensity to set up a "singing" circuit.

It will be observed from the foregoing description of operation that in response a transmission of signals from the terminal station X on frequency f1, the signals are repeated throughout the system on either frequency f1 or f2.

It is important to note that, during the operations described, the repeaters 36 and 39 at repeating station R1 are disabled by the interlock system while the repeater 42 is in operation. This prevents signals that are being transmitted from repeating station R2 on frequency f1 from being received and retransmitted by the repeater 36 at repeating station R1 and prevents repeater 39 from repeating the signals being transmitted from the local antenna 44. Likewise at repeating station R2, while the repeater 39 is retransmitting, the repeater 36 is locked out to prevent it from retransmitting signals on frequency f2 in response to the signals at frequency f1 that are simultaneously being transmitted from the local repeater 39, and the repeater 42 is locked out to prevent it from responding to the signals on frequency f2 from repeating station R3.

At the repeating station R3 the repeaters 36 and 39 are locked out while the repeater 42 is in operation, to prevent the repeaters 36 and 39 from responding to the signals of frequency f1 being transmitted by repeater 42.

*Transmission from mobile station M1*

As shown in Fig. 1 the mobile sub-station M1 is located between the terminal sub-station X and the repeating station R1, and if the operator at station M1 wishes to communicate with the rest of the system, he transmits from the non-directional antenna 33 on frequency f2. His signal is picked up directly by the antenna 31 at the terminal station X, and may also be picked up directly by the stationary sub-station S1, but it is immaterial whether or not station S1 receives the signals directly. The signals are also, of course, picked up at repeating station R1 by the antenna 43 feeding into the repeater 42, which retransmits the signals in both directions along the route on frequency f1 from the antenna 44. The signals are repeated beyond repeating station R1 exactly the same as described in connection with signals originating at station X. The entire area covered by the system will therefore be blanketed with signals emanating from the mobile sub-station M1, either on frequency f1 or frequency f2, and will be picked up on one or the other of the two frequencies at all of the stations.

*Transmission from mobile station M2*

Assume now that a signal originates at the mobile sub-station M2, which at the time is located approximately mid-way between the repeating stations R2 and R3. The transmitter 32 transmits non-directionally from the antenna 33 (Fig. 2) on frequency f2 and the signals are received on the antennas 43 at both repeating stations R2 and R3, and retransmitted non-directionally by both those stations on frequency f1. The signals transmitted on frequency f1 from either repeating station R2 or R3 do not affect the other, because at both stations the units 36 and 39 which are responsive to frequency f1 are locked out. However, the signals transmitted from repeating station R2 on frequency f1 are received at repeating station R1 on antenna 37 and retransmitted by unit 36 on frequency f2 over antenna 38. Likewise, the signals retransmitted from antenna 44 on frequency f1 at repeating station R3 are received by the sub-stations S2, M3 and Y.

It is believed that with the foregoing explanation, the operation of the system can be readily followed regardless of the particular station in the system at which signals originate.

*Apparatus at repeating stations*

Figure 3:
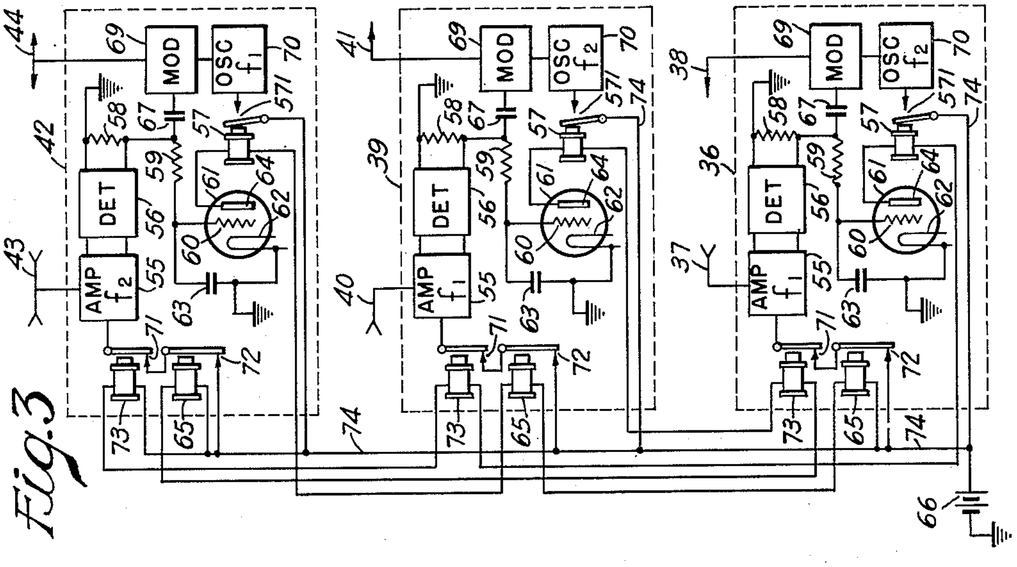
Fig. 3 is a schematic diagram showing in greater detail, than does Fig. 2, the equipment at each repeater station.

One type of apparatus that may be provided at each of the repeating stations will now be described with reference to the schematic diagram of Fig. 3, in which the same reference numerals employed in Fig. 2 designate corresponding parts. It will be observed that the apparatus within all three units 36, 39 and 42 is substantially identical, the only difference being in the frequencies to which the amplifying and oscillating elements are tuned.

Thus, in unit 42, signals of frequency f2 received on the antenna 43 are amplified in an amplifier 55, detected in a detector 56, and applied to a resistor 58, and the voltage across resistor 58 is applied through a resistor 59 to the grid 60 of a triode 61, the grid being connected to the cathode 62 and ground through a condenser 63. The anode 64 of the triode is connected through the winding of a relay 57 in unit 42, the winding of a relay 65 in unit 39 and the winding of a relay 65 in unit 36 to a source of anode potential 66.

The detected audio potentials developed across resistor 58 are also applied through a condensor 67 to a modulator 69. An oscillator 70 supplies carrier current of frequency f1 to the modulator 69, when the oscillator is energized, and the modulated current of frequency f1 is delivered to the transmitting antenna 44.

Normally, when no signals are received, the grids 60 of the tubes 61 in all three of the units 36, 39 and 42 are substantially at the same potential as their cathodes, under which conditions the anode current of each tube is sufficient to energize the relay 57 in the same unit and the relay 65 or the relay 73 in each of the other units. Thus, it will be observed that current from the anode 64 of the tube 61 in unit 42 flows through the local relay 57 through the relay 65 in unit 39, and through the relay 65 in unit 36. The anode current from the tube 61 in unit 39 flows through the winding of local relay 57, through the winding of relay 73 in unit 36, and through the winding of relay 65 in unit 42. The anode current of the tube 61 in unit 36 flows through the winding of the local relay 57, through the winding of relay 73 in unit 39, and through the winding of relay 73 in unit 42. Hence, when the repeating station is in a standby condition all of the relays 57, 65, and 73 are energized. When the relays 57 are energized their contacts 571 are opened to interrupt the supply of anode current to the oscillators 70 so that no signals are being transmitted. However, as long as both the relays 65 and 73 in each unit are energized they close their contacts 71 and 72 respectively to supply anode potential to the receiving amplifier 55, so that all three units are ready to respond to received signals.

When a signal is received by any one of the units, the detected signal develops a negative potential, with respect to ground, across the resistor 58, which is applied through the resistor 59 to the grids 60 of the tubes 61 in that unit and reduces the anode current of that tube to a small value insufficient to hold the relays connected between the anode of that tube and the anode supply source 66. The release of the local relay 57 closes the contacts 571 to supply anode potential to the local oscillator 70 to retransmit the received signals. On the other hand, the release of the relay 65 or 73 in each of the other units opens the contacts 71 or 72 to interrupt the supply of anode potential to the receiving amplifiers 55 in those units, thereby making them non-responsive to received signals.

Thus, assume that while the apparatus in all three units, 36, 39, and 42 is in standby condition, with all of the relays 57, 65, and 73 energized, a signal is received on the antenna 43 of unit 42. This signal is amplified in the amplifier 55, detected in the detector 56 and the detected signal develops a potential across the resistor 58 that is applied through the resistor 59 to the grids 60 of tubes 61 and through the condensor 67 to the modulator 69. The resultant negative potential on the grids 60 reduces the anode current of tubes 61, causing the local relay 57 in unit 42 and the relays 65 in units 39 and 36 to release. The release of relay 57 in unit 42 closes the contacts 571 to energize the oscillator 70 and cause unit 42 to retransmit over antenna 44 the signals being received on the receiving antenna 43. However, the release of relays 65 in units 39 and 36 interrupts the supply of anode potential to the receiving amplifiers 55 in units 39 and 36 and renders them incapable of responding to received signals while the repeating unit 42 is in operation.

Summarizing, it will be observed that the first of the three units 36, 39 and 42 to receive a signal will respond to energize its oscillator to repeat the received signal, while disabling the receiving amplifiers 55 of the other two units and locking them out until the message being received by the first unit is terminated.

*Miscellaneous features*

It is to be understood that, because of limitations on size and weight of the equipment mounted on vehicles, the transmitters at the mobile stations M1, M2 and M3 are desirably of relatively low power. This is permissible in the present system, because the mobile transmitters need only have sufficient power to positively cover half the distance between successive repeating stations. This is apparent from the fact that each repeating station is capable of non-directionally receiving the signals transmitted on frequency *f*2 from the mobile stations, and the latter can never be a distance from a repeating station greater than half the distance between each pair of adjacent repeating stations.

Figure 4:
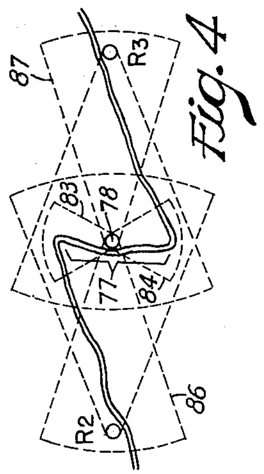
Fig. 4 is a detailed plan view of a small portion of the system of Fig. 1 showing the use of a booster repeater station.

It may happen that, because of local conditions, small portions of the area covered by the system may be in dead spots with respect to the nearest repeating stations, particularly when using high frequency waves that are propagated only in substantially along a line of sight. Thus, referring to Fig. 1, let it be assumed that a portion 77 of the highway 20 runs through a narrow canyon in a direction at an angle to the line interconnecting the next adjacent repeating stations R2 and R3, and that because of this fact mobile units are unable to either transmit or receive to the nearest repeating station R3. Such a situation can be corrected by providing a special auxiliary repeating station 78 (Fig. 4) at a strategic point near the dead section 77. Thus, the station may be located at a high point in direct view of all parts of the road section 77 and also in direct view of the repeating station R3. This repeating station can comprise three interlocked repeaters 79, 80 and 81, generally similar to the units 36, 39 and 42 of the repeating stations R1, R2 and R3 of Figs. 1 and 3, but having special antenna equipment to meet the particular requirements.

Thus, the repeater 79 may have a bi-directional receiving antenna 82 adapted to receive signals on frequency *f*2 emanating from either the repeating station R2 or R3 and may repeat these signals on frequency *f*1 bi-directionally from an antenna 89 into sectors 83 and 84, which include the dead section 77 of the highway. Repeater 80 can have a bi-directional receiving antenna 85 adapted to receive signals on frequency *f*2 from a mobile station on the dead section 77 of the highway and retransmit the signals bi-directionally from an antenna 90 on frequency *f*1 into sectors 86 and 87, which include the repeating stations R2 and R3 respectively. The repeating unit 81 can have a receiving antenna 88 bi-directionally receiving signals on frequency *f*1 from either the repeating station R2 or the repeating station R3, and repeat these signals over a bi-directional antenna 91 into the sectors 83 and 84 on frequency *f*2.

Figure 5:
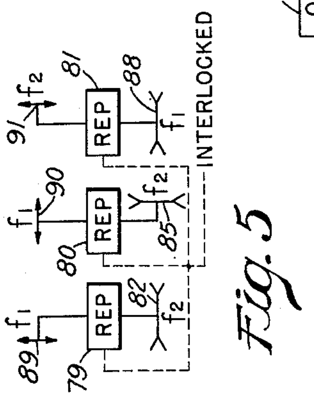
Fig. 5 is a schematic diagram showing the essential equipment elements at the booster station of Fig. 4.

The equipment at an auxiliary repeating station can be modified to fit the particular requirements. Thus, in the particular instance shown (Fig. 1) in which the dead section 77 of the highway is relatively close to the repeating station R3, the antennas 82 (Fig. 5), 90 and 88 may be uni-directional instead of bi-directional, for communication only with the repeating station R3.

In some instances, it is necessary only to boost the relatively low power transmitted from the mobile stations, and, in such a situation, the auxiliary repeating station might include only the single unit 80, the signals emanating from the repeating station R3 being of sufficient power to be received directly on the mobile receiver.

As has been previously indicated, the receivers at all the sub-stations are adapted to receive signals on both frequencies *f*1 and *f*2. Several different types of receiving equipment can be used for this purpose. Two types having particular advantages in the present system are shown schematically in Figs. 7 and 8.

Figures 7, 8:
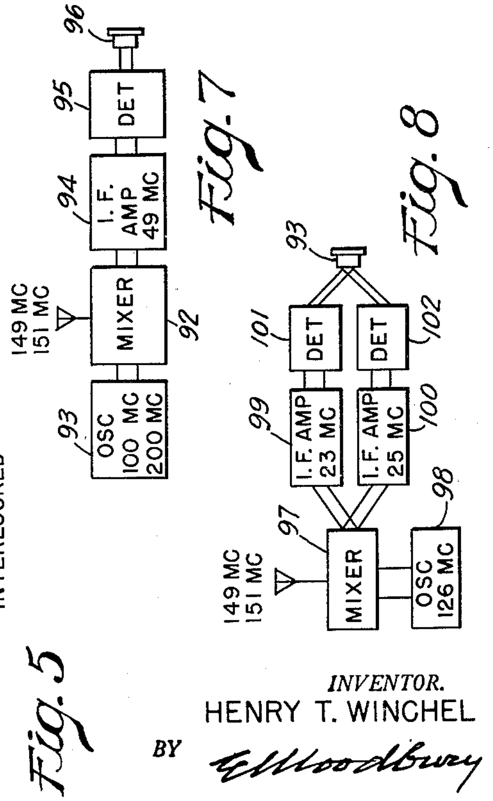
Fig. 7 is a schematic diagram of one type of receiving circuit that can be employed at the substations.
Fig. 8 is a schematic diagram showing another type of receiving circuit that can be employed.

Fig. 7 discloses a special super-heterodyne circuit employing only a single oscillator, that can be used when the frequencies *f*1 and *f*2 are properly chosen. Its operation depends upon having a relation between the two frequencies *f*1 and *f*2 such that one local oscillator frequency beats with frequency *f*1 to produce the desired intermediate frequency, and another, harmonically related, frequency of the local oscillator beats with the frequency *f*2 to produce the same intermediate frequency.

Thus, in Fig. 7, it is assumed that frequency *f*1 is 149 mc., frequency *f*2 is 151 mc., and the intermediate frequency of the receiver is 49 mc. The receiver comprises as its essential elements the usual mixer 92, local oscillator 93, I. F., amplifier 94, detector 95, and telephone 96. The local oscillator 93 is of a common type producing both a fundamental and a harmonic frequency, and in this instance, is designed to developed frequencies of 100 mc. and 200 mc. The 100 mc. component beats with the 149 mc. signal current to produce the intermediate frequency of 49 mc., and the 200 mc. component of the oscillator beats with the 151 mc. signal current to also produce the same intermediate frequency of 49 mc.

It is conceivable that a sub-station may sometimes simultaneously receive signals of both frequency *f*1 and frequency *f*2, but differing slightly from the nominal frequencies by an amount such that they would produce, in the receiving circuit of Fig. 7, intermediate frequencies differing sufficiently to produce an audible whistle which might be objectionable. This effect can be eliminated by staggering the frequencies at different repeating stations sufficiently to cause any beat note to be of frequency above the audible range or at least above the range transmitted by the audio systems of the receivers, and such a method of staggering the frequencies will be described later. However, it is also possible to eliminate any audible whistles that might result from simultaneous reception of signals of frequencies *f*1 and *f*2, by separately amplifying and detecting the signals in the receiver, and a circuit for accomplishing this is shown in Fig. 8.

The receiving system of Fig. 8 comprises a mixer 97, a local oscillator 98, an I. F. amplifier 99 tuned to 23 mc. and an I. F. amplifier 100 tuned to 25 mc., with separate detectors 101 and 102 connected thereto. The mixer 97 feeds into the two I. F. amplifiers and the separate detectors 101 and 102 feed into a common telephone 103. Assuming that the frequency *f*1 is 149 mc. and frequency *f*2 is 151 mc., the local oscillator 98 can have a frequency of 126 mc., which beats with the 149 mc. to produce an I. F. frequency of 23 mc. which is amplified by the I. F. amplifier 99, and beats with the frequency f2 of 151 mc. to produce an intermediate frequency of 25 mc., which is separately amplified in the I. F. amplifier 100. The intermediate frequencies of 23 mc. and 25 mc. are then separately detected in the separate detectors 101 and 102, and all frequencies other than the audio component are eliminated before the audio components are applied to the common telephone 103.

Figure 6:
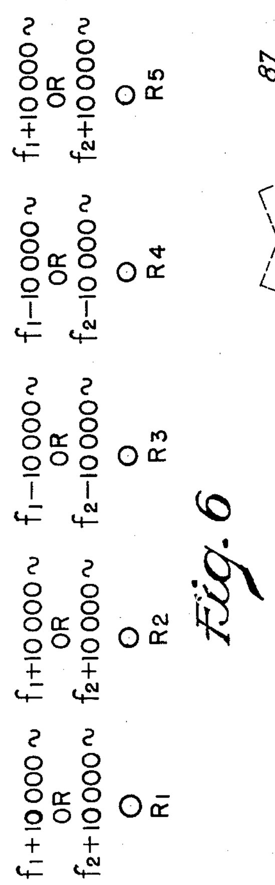
Fig. 6 is a diagram illustrating an allocation of frequencies that may be employed at the repeating stations in the system.

As has been previously indicated, whistles resulting from simultaneous reception by any receiver in the system of signals from two transmitters can produce an audible whistle or beat note if both signals are received in sufficient strength and the carrier frequencies differ by an amount lying within the audio range. Thus, referring to Fig. 2, suppose that a signal originating at the mobile station M1 on frequency f2 is received on antenna 43 at repeating station R1 and is retransmitted on frequency f1 from antenna 44. The signal of frequency f1 from antenna 44 is received on antenna 40 at repeating station R2 and retransmitted on frequency f2 from the uni-directional antenna 41 at repeating station R2. Because of the fact that antenna 41 is uni-directional, the field strength of the signal of frequency f2 transmitted from repeating station R2 will be relatively weak at repeating station R1 as compared to the field intensity of the signal of frequency f2 being received from the mobile sub-station M1, so that it will not be strong enough to set up a "singing" circuit. However, even though the signal of frequency f2 from antenna 41 at repeating station R2 is sufficiently weak at repeating station R1 to cause no trouble in other ways, it may be sufficiently strong to produce an audio beat note or whistle with the strong signal being received from the mobile station M1. Possibility of such whistles can be eliminated in accordance with the present invention by staggering the frequencies of the oscillators at the repeating stations with respect to the nominal frequencies f1 and f2, so that the frequencies transmitted by alternate repeating stations will always differ from each other and from the signals transmitted by the sub-stations, by an amount above the audio range of the receivers in the system. The result can be accomplished by adjusting the transmitters at repeating stations R1 and R2 to transmit at a frequency 10,000 cycles above the nominal value of frequencies f1 and f2, and adjusting the transmitters at repeating station R3 to transmit at frequencies 10,000 cycles below the nominal value of frequencies f1 and f2. Regardless of the number of repeating stations in the system, the same plan can be followed, namely, that of making the first two repeating stations transmit at 10,000 cycles above the nominal values of frequencies f1 and f2, making the next two repeating stations transmit at 10,000 cycles below the nominal values of frequencies f1 and f2 and so on. There is illustrated schematically in Fig. 6 a system including five repeating stations R1 to R5, in which the first two stations R1 and R2 transmit at frequencies of either f1 plus 10,000 cycles, or f2 plus 10,000 cycles. The next two stations R3 and R4 transmit at frequencies of either f1 minus 10,000 cycles or f2 minus 10,000 cycles, and the last station R5 transmits at either f1 plus 10,000 cycles or f2 plus 10,000 cycles. It will be observed that with this system any pair of alternate repeating stations are always transmitting at frequencies differing by 20,000 cycles from each other and by 10,000 cycles from the frequencies used by the sub-stations. Hence, any beat notes resulting are of either approximately 20,000 cycles or 10,000 cycles, which are readily filtered out by the audio circuits of the receivers.

It has been previously explained that the antennas 43 and 44 at each repeating station and the antennas 46 and 48 at the stationary sub-stations are preferably bi-directional for the sole purpose of increasing the efficiency of transmission and reception and that insofar as the operation of the system is concerned, these antennas could be completely non-directional. Likewise, the antennas 29 and 31 at the terminal stations X and Y have been shown as uni-directional for the sole purpose of increasing their efficiency in the useful directions. But these antennas likewise could be non-directional without interfering with the operation of the system. As used in the claims, the words "non-directional" may include bi-directional transmission where in the system covered by the claim, it is not material whether or not the transmission referred to as "non-directional" is completely non-directional. On the other hand, as used in the claims, the word "directional" signifies an antenna structure that definitely has a much lower efficiency of radiation or reception in at least one direction than in another direction.

Although for the purpose of explaining the invention, a particular embodiment thereof has been shown and described, obvious modifications will occur to a person skilled in the art, and I do not desire to be limited to the exact details shown and described.

I claim:

1. In a radio communication system: a plurality of sub-stations distributed along a route of propagation, each sub-station including means for receiving signal-modulated wave energy in both a first and a second frequency band, and means for radiating signal-modulated wave energy in one of said frequency bands; and a plurality of repeating stations distributed along said route of propagation, each repeating station including: a first means for directionally receiving signal-modulated wave energy within said first band from one direction along said route and directionally retransmitting said signal modulation on wave energy in said second band in another direction along said route, a second means for directionally receiving signal-modulated wave energy within said first band from said other direction along said route and directionally retransmitting signal-modulation on wave energy in said second band in said one direction, a third means for non-directionally receiving signal-modulated wave energy in said second band and non-directionally retransmitting said signal modulation on wave energy in said first band, and means responsive to the presence of output energy in any one of said receiving means for disabling the other two receiving means.

2. A system as described in claim 1, in which said sub-stations radiate signal-modulated energy in said second frequency band.

3. A system as described in claim 1, including an auxiliary repeating station for communicatively coupling sub-stations along a portion of said route to one of said repeating stations, said auxiliary repeating station comprising: means for receiving signal-modulated wave energy within either band and retransmitting wave energy modulated with said signal in the other band.

4. A system as described in claim 1, in which said sub-stations transmit wave energy at a predetermined frequency within said second band and receive signal-modulated energy over the entire range of frequencies within said first and second bands, and in which said repeating stations receive signal-modulated energy of all frequencies in said first and second bands and alternate repeating stations transmit at frequencies within said bands displaced from each other by an amount in excess of the width of the audio band passed by the receiving means in the system.

5. A system as described in claim 1, in which said sub-stations transmit at the mean frequency within said second band and receive over the entire range of frequencies within said first and second bands, and in which said repeating stations receive over the entire range of frequencies in said first and second bands, and one of each pair of alternate repeating stations transmits at frequencies displaced in one direction from the mean frequency of the band by an amount in excess of the width of the audio band passed by the receiving means in the system, and the other of each pair of alternate repeating stations transmits at frequencies displaced in the opposite direction from the mean frequency of the band by an amount in excess of the width of the audio band passed by the receiving means in the system.

6. A system in accordance with claim 1 in which: said signal modulations lie below a predetermined frequency; the frequency of said wave energy transmitted by said first means differs from the frequency of the wave energy received by said third means by a value lying between said predetermined frequency and the difference between the frequencies of the energies received by said first and third means respectively; and the frequency of said energy retransmitted by said third means differs by said value from the frequency of the energy received by said first means.

7. A system in accordance with claim 1 in which: the frequencies of said first and second bands have substantially the same nominal value at all said repeating stations but the waves radiated from alternate repeating stations are slightly displaced in opposite senses from said nominal value.

8. A system according to claim 7 in which the magnitude of said displacement exceeds the width of the signal band with which said wave energy is modulated.

HENRY T. WINCHEL.

REFERENCES CITED

The following references are of record in the file of this patent:

UNITED STATES PATENTS

| Number | Name | Date |
|---|---|---|
| 1,624,966 | Morris | Apr. 19, 1927 |
| 1,918,262 | Goldsmith | July 18, 1933 |
| 2,140,730 | Batchelor | Dec. 20, 1938 |
| 2,155,821 | Goldsmith | Apr. 25, 1939 |
| 2,183,741 | Grundmann | Dec. 19, 1939 |
| 2,186,980 | Lowell | Jan. 16, 1940 |
| 2,292,222 | Haigis | Aug. 4, 1942 |
| 2,487,513 | Beverage | Nov. 8, 1949 |

OTHER REFERENCES

Electronics, May 1942, pp. 34 to 51.